May 21, 1968  W. L. McCANN  3,383,957
POSITION FEEDBACK DRIVE MECHANISM FOR MACHINE TOOLS
Filed June 17, 1965  6 Sheets-Sheet 2

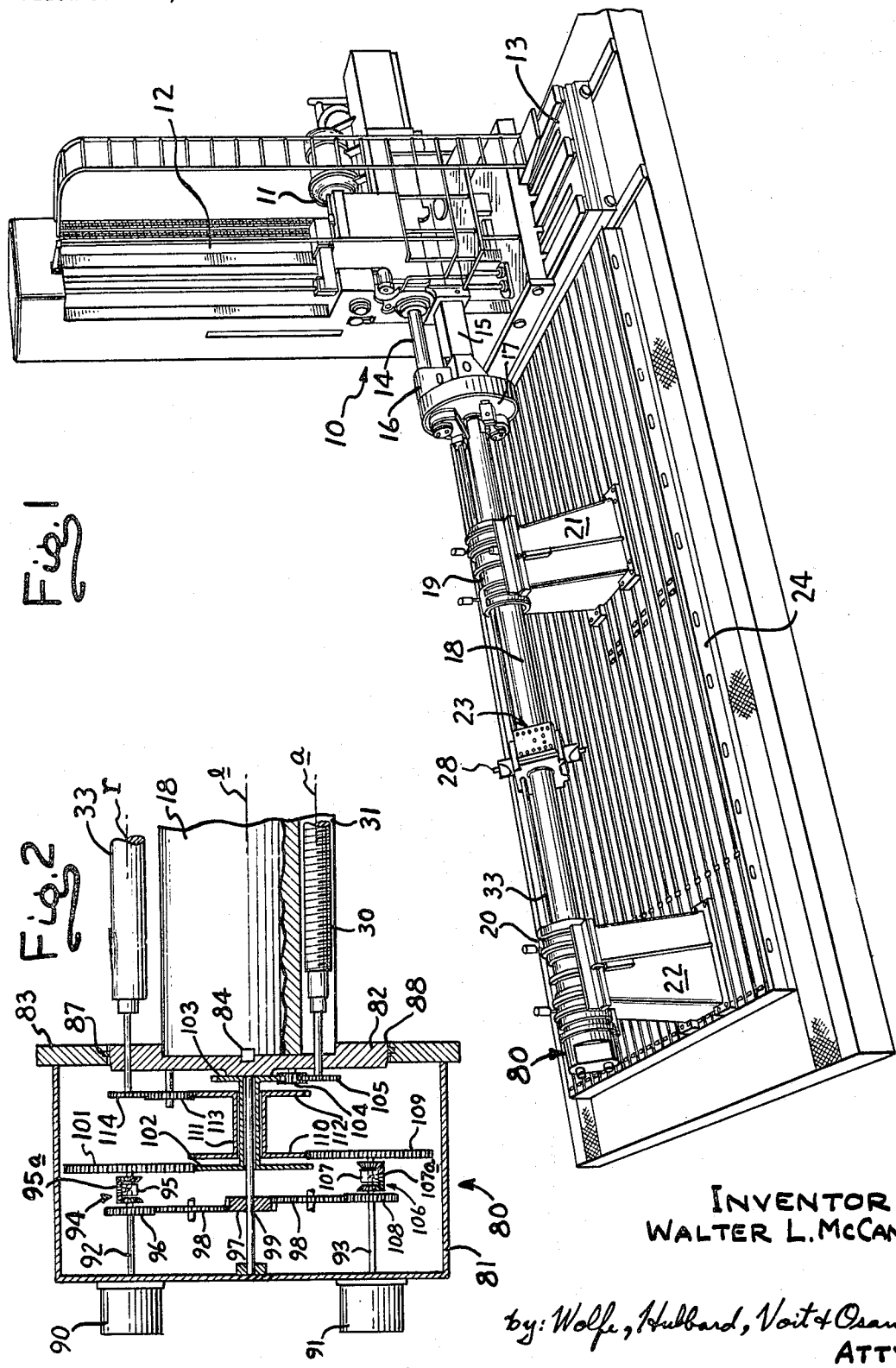

INVENTOR
WALTER L. McCANN
by: Wolfe, Hubbard, Voit & Osann
ATTYS.

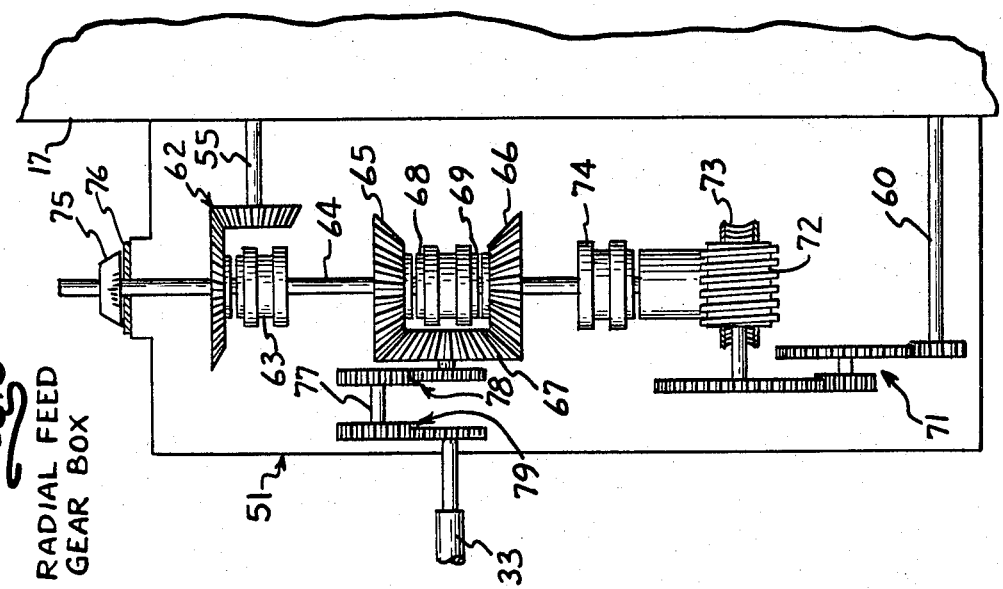
Fig. 6 RADIAL FEED GEAR BOX
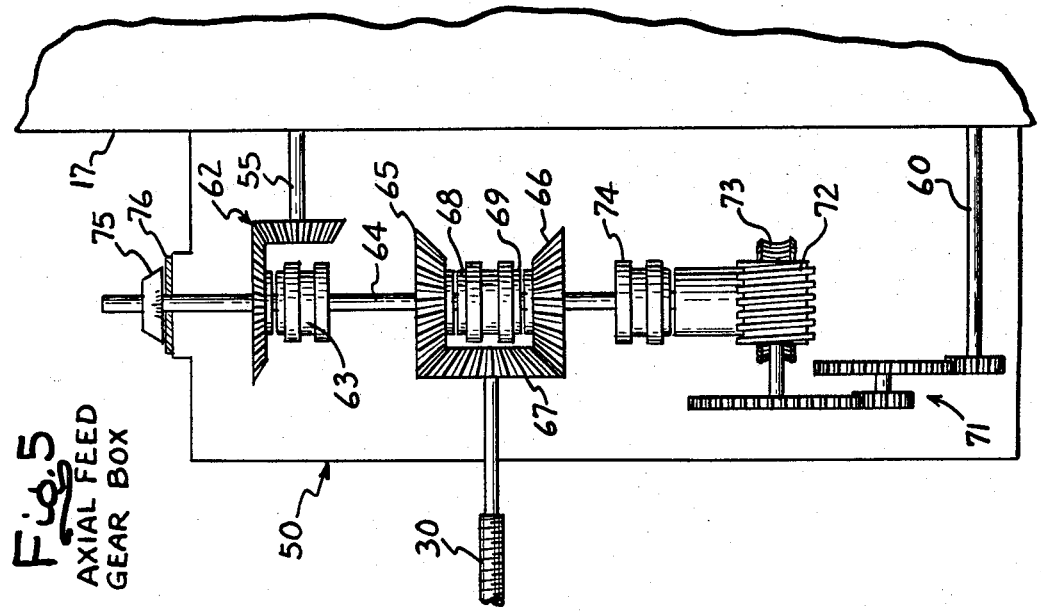
Fig. 5 AXIAL FEED GEAR BOX
INVENTOR
WALTER L. McCANN

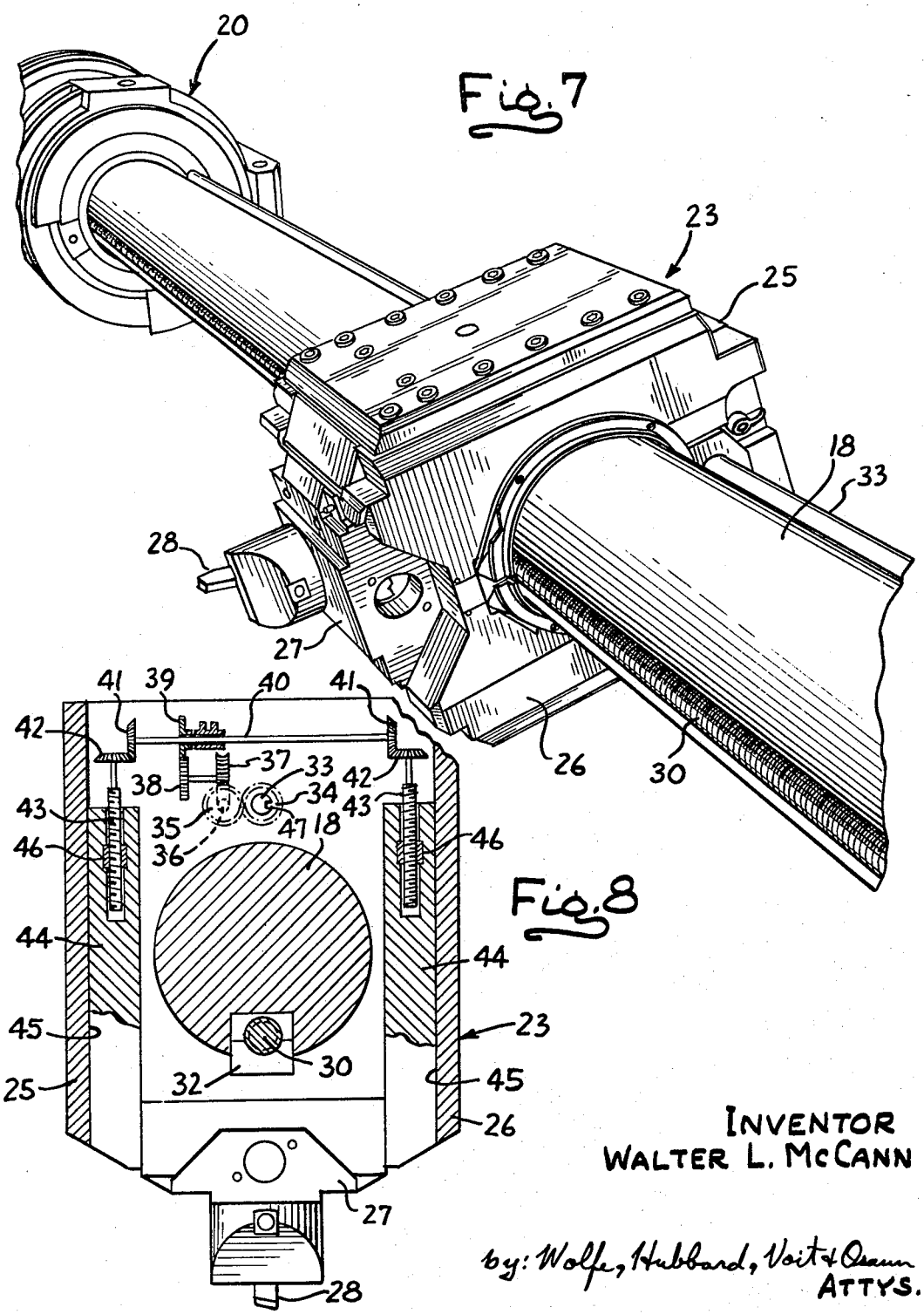

INVENTOR
WALTER L. McCANN
by: Wolfe, Hubbard, Voit & Osann
ATTYS.

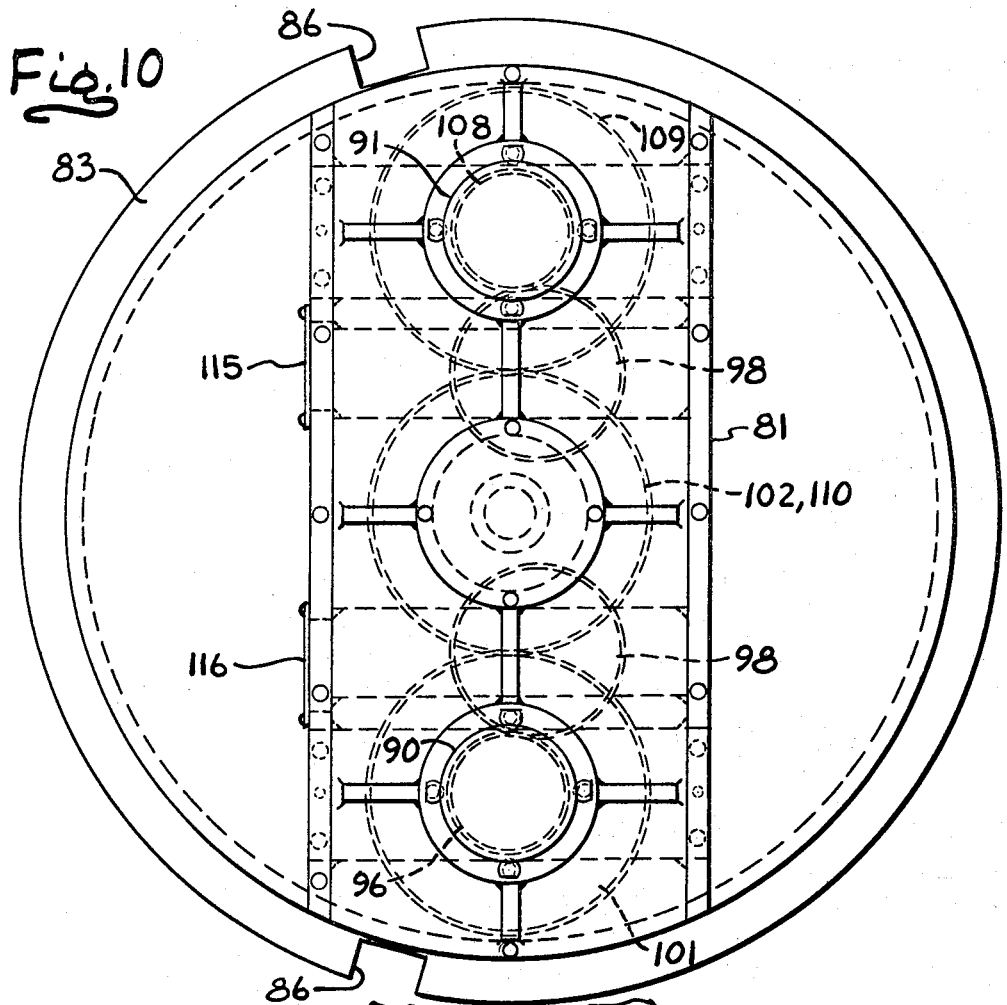
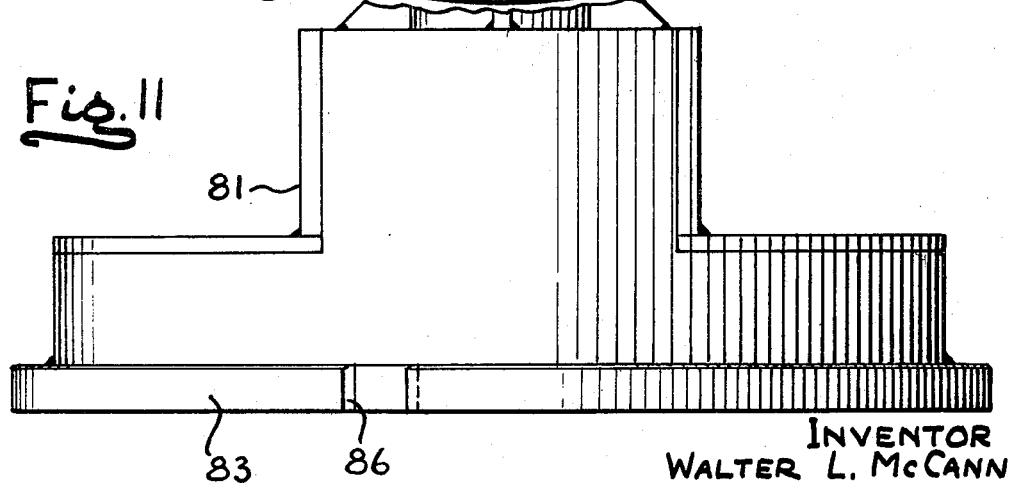

United States Patent Office 3,383,957
Patented May 21, 1968

3,383,957
POSITION FEEDBACK DRIVE MECHANISM FOR MACHINE TOOLS
Walter L. McCann, Fond du Lac, Wis., assignor to Giddings & Lewis Machine Tool Company, Fond du Lac, Wis., a corporation of Wisconsin
Filed June 17, 1965, Ser. No. 464,665
6 Claims. (Cl. 77—3)

ABSTRACT OF THE DISCLOSURE

A position feedback drive mechanism for a machine tool employing a differential gear assembly with one input driven by the rotating tool head and the other input driven by the tool support such that the output is proportional to movements of the tool support with respect to the axis of the tool head and thereby serves as an accurate indication of the position of the tool.

---

This invention relates generally to machine tools and more particularly concerns a feedback drive mechanism for a position readout device for a tool slide carried by a rotatable tool head of such machines.

In recent years great strides have been made toward automating the control functions of machine tools. There are numerous control devices which are capable of regulating the axial feed of a rotating tool head. Similarly, other devices have been developed for controlling the radial position or feed rate of the cutting tool carried by such axially positionable rotating tool head. Although controlling these axial and radial feed rates for machine tools is quite important, it is equally important to accurately and instantaneously obtain an indication of both the axial and radial positions of the rotating tool.

Accordingly, the primary aim of the present invention is to provide a position feedback mechanism for indicating a continuous visual numerical readout of both the axial and radial positions of the rotating tool.

Another object of the invention is to provide a feedback mechanism of the above type for accurately indicating the position of a rotating tool at a remote location.

It is a more specific object of the present invention to provide a precision drive for a position feedback mechanism of the above type.

Other objects and advantages of the invention will become more readily apparent upon reading the following detailed description and upon reference to the attached drawings in which:

FIGURE 1 is a perspective view of an illustrative machine tool of the horizontal boring bar type which embodies the features of the present invention;

FIG. 2 is an enlarged cross section of the position feedback mechanism of the present invention illustrated in somewhat schematic form;

FIGS. 5 and 6 are still further enlarged generally schematic sections taken through the face plate transmissions illustrated in FIGS. 3 and 4;

FIG. 7 is an enlarged perspective view of the rotatable tool head mounted on the boring bar of the illustrative machine tool;

FIG. 8 is a section taken through the tool head shown in FIG. 7 with the drive components illustrated in generally schematic fashion;

FIGS. 10 and 11 are end and top plan views of the position feedback mechanism, respectively.

Figure 4:
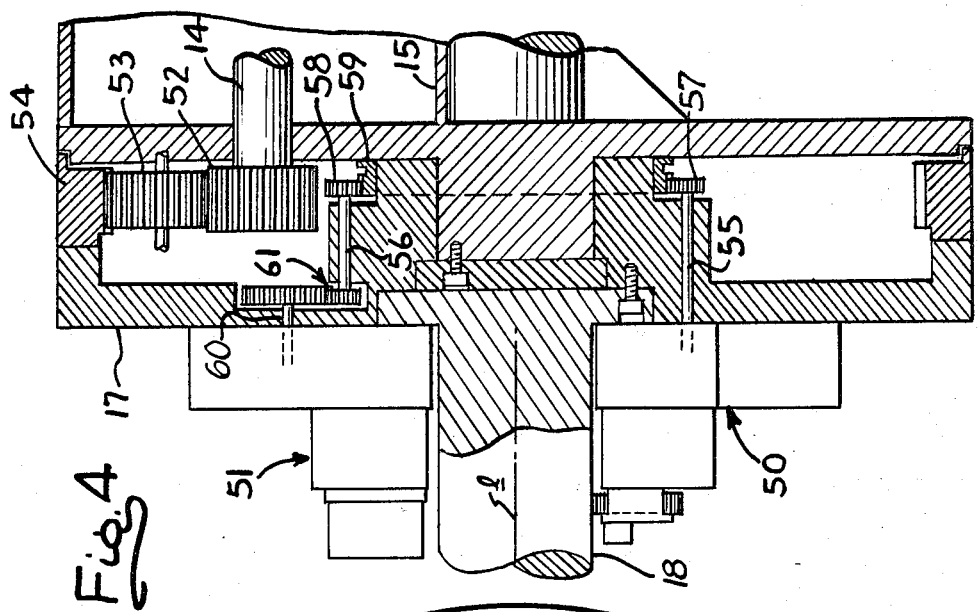
FIG. 4 is an enlarged fragmentary side elevation, partially in section, of the face plate shown in FIG. 3.

While the invention will be described in connection with the illustrative embodiment shown in the drawings, it will be understood that I do not intend to limit the invention to that embodiment. On the contrary, I intend to cover all alternatives, modifications and equivalents as may be included within the spirit and scope of the invention as defined by the appended claims.

Referring now to the drawings, there is shown in FIGURE 1 an illustrative machine tool 10 which embodies the novel features of the present invention. While it will be recognized by those skilled in the art that the illustrated machine tool 10 is of the horizontal boring mill type, the present invention is not limited to machine tools of this type.

In general, the machine tool 10 includes a headstock 11 supported for vertical adjustment on a column 12. The column 12, in turn, is horizontally adjustable on a supporting bed or runway 13. The headstock 11 journals a spindle 14 and supports an underarm 15 which is mounted for movement parallel to the spindle 14. The outer end of the underarm 15 carries a support 16 adapted to receive the spindle 14 and to support a facing plate 17.

As shown in FIG. 1, the facing plate 17 of the machine tool 10 is coupled to an elongated horizontal boring bar 18 which is journaled in bearing blocks 19 and 20 mounted on top of a pair of spaced apart pedestals 21 and 22. Between the pedestals 21, 22 the boring bar 18 supports a boring head 23 rotatable with the boring bar and axially movable thereon. Desirably, the pedestals are adjustably mounted on a slotted deck or platform 24 on which a workpiece or workpiece holder (not shown) may be secured during operation of the machine tool.

Turning now to FIGS. 7 and 8, it will be seen that the boring head 23 in the exemplary machine is of relatively massive construction comprising two clamp-like halves 25 and 26 secured together so as to completely encircle the boring bar 18. Mounted on the boring head 23 is a tool slide 27 which is movable radially with respect to the boring bar 18 and boring head 23. A cutting tool 28 of appropriate type for the work being done is rigidly secured to the tool slide 27.

As will be understood by those skilled in the art the illustrative machine tool 10 and horizontal boring bar 18 are commonly employed to perform boring and other internal machining operations on large castings such as motor and turbine housings. In such cases, the workpiece is ordinarily secured to the platform 24 with the opening or surface which is to be machined oriented coaxially with the boring bar 18. Customarily, regulation of the boring or machining operation is then controlled by moving the boring head 23 and the cutting tool 28 along the boring bar 18 with respect to the workpiece, which is known in the art as axial feed; and moving the tool slide 27 and tool 28 radially with respect to the boring bar 18 and the workpiece, which is known in the art as radial feed.

Axial feed of the boring head 23 in the exemplary machine tool 10 is controlled by rotation of an axial feed shaft 30 rotatably supported in a slot 31 formed in the boring bar 18. In the present instance the feed shaft 30 is in the form of an elongated screw which threadedly engages a nut 32 rigidly secured to the boring head 23. Thus, rotation of the shaft 30 serves to move the boring head axially along the boring bar in either direction depending on the direction of rotation of the screw.

Radial feed of the tool slide 27 in the exemplary machine tool 10 is similarly controlled by rotation of a radial feed shaft 33 rotatably supported by the boring head in parallel relation to the boring bar 18. Within the boring head 23, a drive gear 34 slidably keyed to the radial feed shaft 33 meshes with a drive or gear 35 coupled to a worm 36 which engages another gear 37. The gear 37 is rigidly coupled to a gear 38 which, in turn, meshes with a gear 39 clutched to a bevel gear drive shaft 40 journaled in the boring head. The bevel gear drive shaft carries at its ends a pair of bevel gears 41 which engage bevel gears 42 secured to a pair of drive screws 43 journaled for rotation in opposite sides of the boring head transversely with respect to the boring bar. The tool slide 27 includes a pair of leg members 44 slidably mounted in grooves 45 defined in the boring head and each leg member 44 carries a nut 46 disposed to threadingly engage one of the drive screws 43. Thus, it will be appreciated that rotation of the radial feed shaft 33, through the several intermediate gears rotates the drive screws 43 to move the tool slide in or out with respect to the boring bar 18 depending on the direction of rotation of the shaft 33. Preferably, the radial feed shaft 33 is formed with an elongated groove 47 cut parallel to the axis of the boring bar 18 and the drive gear 34 is slidably keyed in the groove so that the gear 34 slides on the shaft 33 as the boring head 23 is shifted axially along the bar 18.

To drive the axial and radial feed shafts 30, 33, a pair of transmission units 50 and 51 are carried on the rotatable face plate 17 of the machine tool 10. At this point it should be noted that as the face plate 17, boring bar 18 and boring head 23 rotate about a common axis $l$, the axial and radial feed shafts 30, 33 also rotate bodily about this same axis. Rotation of the feed shafts 30, 33 about the axis $l$ does not, however, result in either axial or radial feed of the tool 28 as long as the shafts 30, 33 are not rotated about their own respective axes $a$ and $r$. In other words, it is only when the feed shafts 30, 33 are independently rotated about their axes $a$, $r$ that any axial or radial translation is imparted to the normally rotating tool 28.

Figure 3:
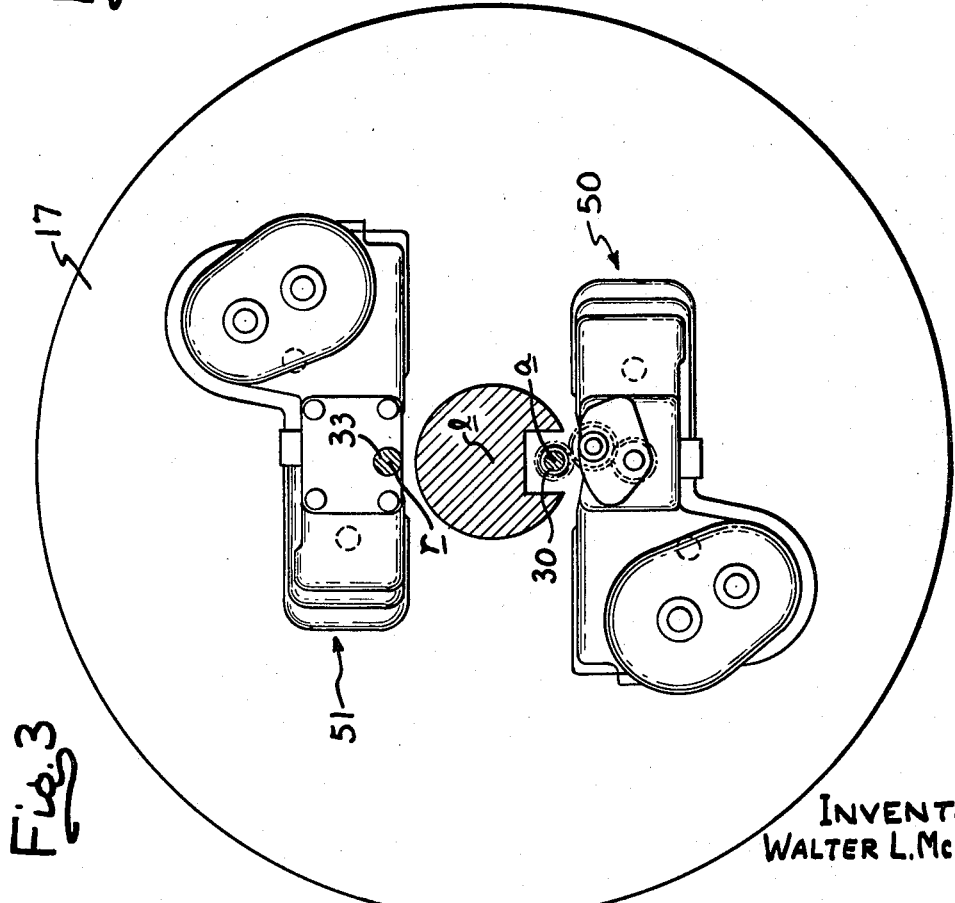
FIG. 3 is an enlarged fragmentary front elevation of the rotatable face plate of the illustrative machine tool.

The locations of the transmissions 50, 51 on the face plate 17 and the driving arrangements of the face plate and the transmissions are best illustrated in FIGS. 3 and 4. As shown in FIG. 3, the transmissions 50, 51 are mounted on the face plate on opposite sides of the boring bar 18 and rotate in unison therewith. In FIG. 4 it will be seen that the face plate is driven by a gear 52 secured on the spindle 14 which meshes with an idler gear 53 engageable with an internally toothed ring gear 54 secured to the face plate. The face plate also journals two pairs of transmission drive shafts 55 and 56 (one of each pair being shown) carrying gears 57 and 58, respectively, engageable with an externally toothed, stationary ring gear 59 rigidly secured to the underarm 15 of the machine tool 10. Thus, as the face plate 17 and drive shafts 55, 56 are rotated in unison about the axis $l$ by the spindle 14 the drive shafts 55, 56 are also caused to rotate about their own axes due to engagement of the ring gear 59 with the gears 57, 58. It will also be noted that each of shafts 56 drives a stub shaft 60 through a gear reduction set 61 enclosed in the face plate 17.

Within the axial feed transmission 50 means are provided for selectively interconnecting one pair of the shafts 55, 60 with the axial feed shaft 30. As shown in FIG. 5, a bevel gear set 62 and a clutch 63 selectively couple the drive shaft 55 with a shaft 64 in the transmission 50. The shaft 64 also carries bevel gears 65 and 66 that mesh with a bevel gear 67 on the axial feed shaft 30 and reversibly drive the feed shaft upon engagement of one or the other of a pair of bevel gear clutches 68 and 69. It will be recalled from FIG. 4 that shaft 55 is driven directly by the ring gear 59 in the face plate. This direct drive for the shaft 55 thereby permits rapid traversing of the boring head 23 in either direction on the boring bar 18 upon selective engagement of clutches 63 and 68 or 69. As will be understood, rapid traversing of the boring head permits the cutting tool 28 to be quickly advanced or retracted with respect to the workpiece, since this speed is ordinarily much more rapid than the working feed rate.

To drive the axial feed shaft 30 during the working operation, the drive shaft 60 is coupled to shaft 64 through a change gear set 71, a worm gear 72, a driven gear 73 and a clutch 74. The change gear set 71 and worm gear 72 provide a suitable speed reduction for the axial feed shaft 30 and the worm gear also serves as a positive drive member. The bevel gears 65, 66 and the clutches 68, 69 on the shaft 64 provide reversible drive to the axial feed shaft from drive shaft 60 as well as from drive shaft 55. In the illustrated embodiment, the shaft 64 extends out of the transmission 50 and an indicator wheel 75 is secured to and rotates with the shaft adjacent an index plate 76 on the transmission.

For driving the radial feed shaft 33 the transmission 51 is arranged generally the same as the axial feed transmission 50. Referring to FIG. 6, the same reference numerals have been used to identify those elements in the radial feed transmission which have counterparts in the previously described axial feed transmission. In order to accommodate the radially spaced location of the radial feed shaft 33 with respect to the boring bar 18, the radial feed transmission has been provided with an offset drive shaft 77 and gear couples 78 and 79 at either end for interconnecting the bevel gear 67 with the feed shaft 33.

In accordance with the present invention a feedback drive mechanism, indicated generally at 80, is provided for obtaining a continuous numerical readout of both the axial and radial positions of the tool 28. As shown in FIGS. 1 and 2, the feedback drive mechanism 80 in the illustrative machine tool 10 is located at the remote end of the boring bar 18 adjacent the left hand support pedestal 22. In order to obtain remote visual readout indications, a visual readout panel such as illustrated in Fitzner Patent No. 3,048,832, assigned to the same assignee as the present invention, may be used in connection with the novel feedback drive mechanism of the present invention. The present invention, of course, is also capable of being used in connection with fully automated equipment such as numerical control devices.

Turning now to FIGS. 2 and 9–11, it will be seen that the feedback mechanism 80 includes a housing 81 and a pair of concentric end plates 82 and 83. The inner end plate 82 is secured to the end of the boring bar 18 for rotation therewith by means such as a key 84. The housing 81 and outer end plate 83, on the other hand, are nonrotatably secured to the support pedestal 22 by a pair of angularly spaced brackets 85 (only one of which is shown) that slidably engage a pair of notches 86 formed in the outer end plate 83. Desirably, a ring element 87 serves to both journal and seal the inner end plate 82 in an opening 88 formed in the outer end plate 83.

For indicating axial and radial movements of the tool 28, two resolvers 90 and 91 are mounted on the housing 81 of the feedback mechanism 80 so that the drive shafts 92 and 93 of the resolvers are parallel to the axis $l$ of the boring bar 18. Within the housing 81 the feedback mechanism 80 includes a gear drive connection between each of the resolvers 90, 91 and the respective feed shafts 30, 33. In the illustrated device, the drive connections, as will be hereinafter described, are arranged to couple the feed shafts 30, 33 to the resolver drive shafts 92, 93 with a 1:1 gear ratio, although other ratios may be selected, if desired.

For actuating the axial resolver 90 a differential gear unit 94 is supported in the housing 81 coaxially with the resolver shaft 92 and connected thereto by means of a coupling 95 which journals a differential output gear 95a. One input gear 96 of the differential 94 is drivingly connected to a sun gear 97 by a direction reversing idler gear 98. The sun gear 97 is fixed on a shaft 99 secured to the boring bar 18 and aligned with the axis $l$ thereof.

The other input gear 101 of the differential 94 is drivingly connected to the axial feed shaft 30 through a sun gear 102 rotatably journalled on the shaft 99. A gear 103 rigid with the sun gear 102 meshes with a direction reversing idler gear 104 which in turn meshes with a gear 105 coupled to the axial feed shaft 30.

When the boring bar 18 is rotated and the tool head 23 is maintained in fixed axial position on the rotating boring bar 18, the input gears 96, 101 of the differential 94 will be rotated at a speed proportional to the boring bar but in opposite directions to one another. So long as the rotation of the two input gears 96, 101 is equal but opposite in direction, the resolver shaft 92 will remain stationary. However, when the tool head 23 is moved by rotation of the axial feed shaft 30 about its own axis $a$, this rotation relative to the boring bar 18 will result in either a speed-up or slow-down of the input gear 101. The rate of rotation of the input gear 101 with respect to the input gear 96 thereby serves as a measure of the axial motion imparted to the tool head 23 by the feed shaft 30. The resolver shaft 92, in turn, will rotate and generate a signal in the resolver 90 representative of this movement.

To indicate radial feed of the tool 28, the resolver 91 is connected to the radial feed shaft 33 by a second gear train which is substantially a duplicate of that described for resolver 90. A differential unit 106 is aligned with and connected to the resolver shaft 93 by a coupling 107 which journals a differential output gear 107a. The differential 106 has aligned input gears 108 and 109 which are connected to gears 97 and 110, respectively. The gear 110 is fixed on a rotatable sleeve 111 concentric with gear 102 and a gear 112 rigid with gear 110 completes the drive to the radial feed shaft 33 through an idler gear 113 and gear 114 secured to the feed shaft 33.

As in the case of the axial position resolver 90, the radial position resolver shaft 93 remains stationary so long as the input gears 108, 109 of the differential 106 continue to equally and oppositely rotate. This situation, of course, prevails while the output gear 114 of the radial feed shaft 33 continues to orbit about the sun gear 112 in unison with the rotation of the boring bar 18 about its axis $l$. However, when the radial feed shaft 33 is rotated about its own axis $r$ a differential drive is imparted to the output gear 107a and the resolver shaft 93 is rotated indicating the radial movement of the tool slide 27 and tool 28 relative to the boring bar axis $l$.

Figure 9:
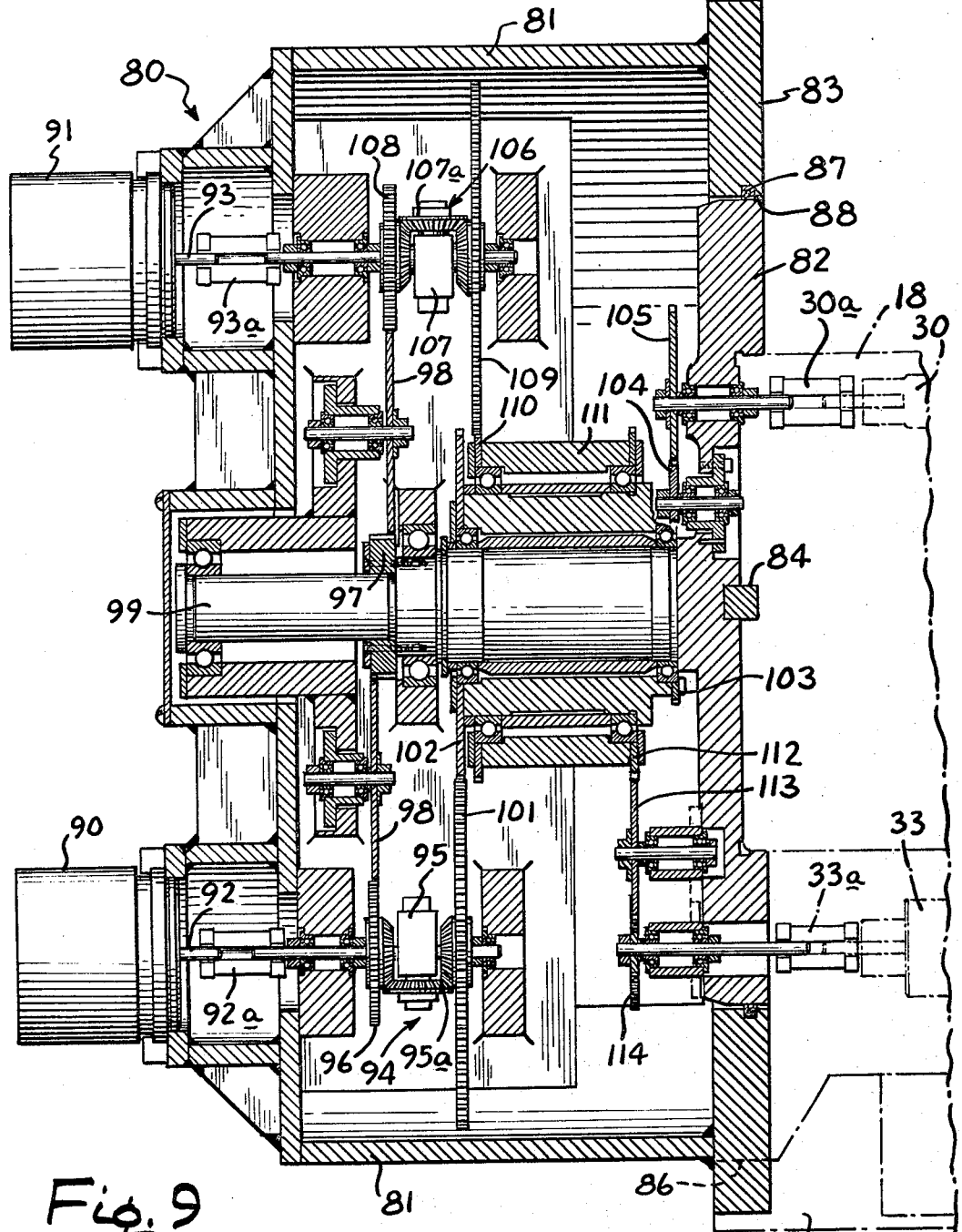
FIG. 9 is an enlarged cross section of the position feedback mechanism.

The novel position readout mechanism of the present invention, particularly as illustrated in FIGS. 9–11, has proven to be a highly accurate device which is capable of indicating axial and radial tool positions with the extreme accuracy that is necessary with modern high speed, automatically controlled and programmed machine tools. It will also be noted that the housing 81 affords a rigid mounting framework for the precision gear-type drive components, each of which is independently journaled in antifriction bearings, which couple the feed shafts 30, 33 to the respective resolver drive shafts 92, 93.

As previously indicated, a pair of brackets 85 secured to the pedestal 22 support the resolver housing 81. Moreover the notches 86 in the outer end plate 83 in which the brackets 85 are engaged insure that the entire resolver mechanism 80 is free to move axially with respect to the pedestal 22 in the event of a change in the length of the boring bar 18, such as due to thermal expansion or contraction. In addition, since proper alignment of the driving components within the resolver is of great importance to precise readout indications, slip joint couplings 30a, 33a, 92a and 93a are desirably provided for the respective connections to shaft 30, 33, 92 and 93. Thus, any change in the length of these shafts will not adversely affect the proper meshing of the various gear-type drive components within the resolver 80. Furthermore, the housing 81 is also desirably equipped with a pair of removable cover plates 115 and 116 that permit visual inspection of the drive trains for both resolvers 90, 91.

From the foregoing, it will be appreciated that the position feedback drive mechanism 80 of the present invention is adapted to provide an instantaneous and continuous indication of both the radial and axial positions of the rotating tool 28 relative to the axis $l$. In addition, since the axial and radial readout resolvers 90, 91 are both mounted on the stationary housing 81, they can be readily observed during operation of the machine tool 10. This arrangement also obviates the necessity of slip ring devices to complete electrical connections to the resolvers in those applications where a remote readout panel such as illustrated in the above Patent No. 3,048,832 is employed. Thus, the present invention provides accurate and reliable readouts of the axial and radial positions of the rotating tool 28 without requiring stopping the boring bar and physically measuring the position of the tool.

I claim as my invention:

1. In a machine tool having a facing head rotatably mounted in a frame, the combination comprising, a tool support mounted for rotation with said head about a first axis, said support being also mounted for movement along said axis and radially of said axis, a pair of shafts mounted with said head and said tool support so as to be carried about said axis, said shafts being coupled to said tool support for rotation about their own axes incident to movement of the support along said axis and movement of the support radially of said first axis, respectively, a pair of differential gear assemblies fixed with respect to said frame and each having two inputs driving an output, means including a first gear mounted coaxially of said first axis rotatably coupling said head with one of said inputs in each of said gear assemblies, means including a second gear mounted coaxially about said first gear rotatably coupling one of said shafts with the other input of one of said assemblies, means including a third gear mounted coaxially about said second gear rotatably coupling the other of said shafts with the other input of the other of said assemblies, said means rotating the inputs of said assemblies in opposite directions, upon rotation of said tool support, at rates keeping said outputs stationary so long as said shafts do not rotate about their own axes, and a pair of readout members rotatably connected respectively to said outputs whereby movement of said tool support axially and radially of said first axis is reflected by proportional rotation of said readout members.

2. A position readout mechanism for a machine tool having an axially movable rotating tool head with a radially positionable tool slide mounted thereon comprising, in combination, first and second shafts disposed parallel to the axis of rotation of said tool head and rotatable therewith, said first and second shafts each being rotatable about their own axes to selectively control the axial position of said tool head and radial position of said tool slide, respectively, first and second differential gear units each having first and second input gears and an output gear engageable therewith, means for rotating in one direction each of said first input gears in unison with said tool head, means for rotating in the opposite direction said respective second input gears at a rate equal to the summation of the rate of rotation of said respective first and second shafts around their own axes and around said tool head axis, and first and second position readout members respectively coupled to said output gears of said first and second differential units whereby the rotation of said first readout member is proportional to the rotation of said first shaft and thus is an indication of the axial position of said tool head and whereby the rotation of said second readout member is proportional to the rotation of said second shaft and thus is an indication of the radial position of said tool slide.

3. A position readout mechanism for a machine tool having an axially movable rotating tool head comprising, in combination, an axial feed shaft disposed parallel to the axis of rotation of said tool head and rotatable therewith, said feed shaft also being rotatable about its own axis, driving means between said feed shaft and said tool head to produce axial movement of said tool head upon rotation of said feed shaft about its own axis, a differential gear unit having first and second input gears and output gear engageable therewith, means for rotating in one direction said first input gear in unison with said tool head, means for rotating in the opposite direction said second input gear at a rate equal to the summation of the rate of rotation of said feed shaft around its own axis and around said tool head axis, and a position readout shaft coupled to said output gear whereby the rotation of said readout shaft is proportional to the rotation of said feed shaft about its own axis and thus is an indication of the axial position of said tool head.

4. A position readout mechanism for a machine tool having a rotatable tool head with a radially adjustable tool mounted thereon comprising, in combination, a radial feed shaft disposed parallel to the axis of rotation of said tool head and rotatable therewith, said feed shaft also being rotatable about its own axis, driving means between said feed shaft and said tool to produce radial movement of said tool upon rotation of said feed shaft about its own axis, a differential gear unit having first and second input gears and an output gear engageable therewith, means for rotating in one direction said first input gear in unison with said tool head, means for rotating in the opposite direction said second input gear at a rate equal to the summation of the rate of rotation of said feed shaft around its own axis and around said tool head axis, and a position readout shaft coupled to said output gear whereby the rotation of said readout shaft is proportional to the rotation of said feed shaft about its own axis and thus is an indication of the radial position of said tool.

5. In a machine tool having an axially movable rotating facing head, the combination comprising, a tool support mounted for rotation with said head about the axis of rotation thereof, a shaft mounted with said head and said tool support so as to be carried about said axis, said shaft also being rotatable about its own axis, driving means between said shaft and said facing head causing rotation of said shaft about its own axis upon axial movement of said facing head, a differential gear assembly having two inputs driving an output, means including a first gear mounted coaxially of said head axis rotatably coupling said head with one of said inputs, means including a second gear mounted coaxially of said first gear rotatably coupling said shaft with the other of said inputs, said means rotating said inputs in opposite directions upon rotation of said facing head at rates keeping said output stationary so long as said shaft does not rotate about its own axis, and a readout member rotatably connected to said output whereby rotation of said shaft about its own axis incident to said axial movement of said head varies the relative rotational rates of said inputs so that said output rotates said readout member proportionally to said axial movement.

6. In a machine tool having a rotating facing head, the combination comprising, a tool support mounted for rotation with said head about the axis of rotation thereof and for radial movement with respect to said head, a shaft mounted with said head and said tool support so as to be carried about said axis, said shaft also being rotatable about its own axis, driving means between said shaft and said tool support causing rotation of said shaft about its own axis incident to radial movement of said support, a differential gear assembly having two inputs driving an output, means including a first gear mounted coaxially of said head axis rotatably coupling said head with one of said inputs, means including a second gear mounted coaxially of said first gear rotatably coupling said shaft with the other of said inputs, said means rotating said inputs in opposite directions upon rotation of said facing head at rates keeping said output stationary so long as said shaft does not rotate about its own axis, and a readout member rotatably connected to said output whereby rotation of said shaft about its own axis incident to said radial movement of said tool support varies the relative rotational rates of said inputs so that said output rotates said readout member proportionally to said radial movement.

References Cited

UNITED STATES PATENTS 2,392,556   1/1946   Seppeler _____ 74—675

FOREIGN PATENTS 228,126   10/1943   Switzerland.

DONLEY J. STOCKING, *Primary Examiner.*

ARTHUR T. McKEON, *Examiner.*

J. R. BENEFIEL, *Assistant Examiner.*